United States Patent
Choksi et al.

(10) Patent No.: US 8,319,475 B2
(45) Date of Patent: Nov. 27, 2012

(54) BATTERY PACK IDENTIFICATION SYSTEM

(75) Inventors: Snehal Choksi, Owings Mills, MD (US); Fugen Qin, Baltimore, MD (US); Daniel Joseph White, Baltimore, MD (US); Danh Trinh, Parkville, MD (US); Edward Allen Harrison, Bel Air, MD (US); Bhanuprasad V. Gorti, Perry Hall, MD (US); David A. Carrier, Aberdeen, MD (US); Regina Gracia C. Cunanan, Parkville, MD (US); Nathan Cruise, Phoenix, MD (US); Daniele Brotto, Baltimore, MD (US); Geoffrey Stephen Howard, Columbia, MD (US); Michelle Lynn Bowers, Westminster, MD (US); Andrew Seman, Jr., White Marsh, MD (US); Rouse Roby Bailey, Jr., New Park, MD (US)

(73) Assignee: Black & Decker Inc., Newark, DE (US)

( * ) Notice: Subject to any disclaimer, the term of this patent is extended or adjusted under 35 U.S.C. 154(b) by 1187 days.

(21) Appl. No.: 12/157,974

(22) Filed: Jun. 13, 2008

(65) Prior Publication Data

US 2008/0309285 A1 Dec. 18, 2008

Related U.S. Application Data

(60) Provisional application No. 60/943,919, filed on Jun. 14, 2007.

(51) Int. Cl.
H02J 7/00 (2006.01)
(52) U.S. Cl. ......... 320/110; 320/106; 320/107; 320/114
(58) Field of Classification Search .................. 320/106, 320/110, 114, 107
See application file for complete search history.

(56) References Cited

U.S. PATENT DOCUMENTS 7,176,654 B2 2/2007 Meyer et al.
2006/0087285 A1* 4/2006 Phillips et al. ................ 320/114
* cited by examiner

*Primary Examiner* — Bot Ledynh
(74) *Attorney, Agent, or Firm* — Michael Aronoff; Adan Ayala

(57) ABSTRACT

A control module is included in a battery charger that is adapted to charge a plurality of battery packs of different types or a power tool that is adapted to be powered by at least one of the battery packs. The control module includes a remote sensing module that communicates remotely with one of the battery packs. The control module also includes a battery pack connection module that determines that the one of the battery packs is in electrical communication with at least one of the battery charger and the power tool. The control module also includes a battery pack identification (ID) module that determines a first type of the battery pack based on remote sensing module signals. The control module also includes a charge control module that determines at least one of a charge setting and a discharge setting for the battery pack based on the first type.

12 Claims, 5 Drawing Sheets

BATTERY PACK IDENTIFICATION SYSTEM

CROSS-REFERENCE TO RELATED APPLICATIONS

This application claims the benefit of U.S. Provisional Application No. 60/943,919 filed on Jun. 14, 2007. The disclosure of the above application is incorporated herein by reference.

FIELD

The present disclosure relates to power tools and more particularly to battery packs and chargers for power tools.

BACKGROUND

Cordless products/devices, such as power tools and laptop computers, often use rechargeable batteries. Types of rechargeable batteries may include nickel-cadmium, nickel-metal-hydride battery and/or lithium-ion cell chemistries. Since the cordless devices often use a plurality of battery cells, the battery cells may be ordinarily packaged as battery packs that may be coupled to the cordless devices. Battery packs may be charged in the cordless devices or alternatively removed from the cordless devices and charged in battery chargers.

Various parameters may be set according to battery type. For example, remaining battery charge may be monitored and a charging state may be determined. Detection of a charging state is usually carried out in terms of the polar voltage of the battery. Batteries of different types have different characteristic curves of polar voltage-charging in relation to the remaining charge and also different charging capacity values. Thus, a predetermined and fixed voltage threshold for determining when to stop charging the battery may be optimal for one type of battery, but not for another.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A battery charger that is adapted to charge a plurality of battery packs of different types includes a plurality of terminals. The battery charger electrically communicates with one of the battery packs through the plurality of terminals. A remote communication device of the battery charger generates signals in response to remote detection of the battery pack. A control module of the battery charger includes a remote sensing module that receives signals from the remote communication device. The control module further includes a battery pack connection module that determines that the battery pack is in electrical communication with the battery charger based on communications with the battery pack through the plurality of terminals. The control module further includes a battery pack identification (ID) module that determines a first type of the battery pack based on remote sensing module signals. The control module further includes a charge control module that determines at least one of a charge setting and a discharge setting for the battery pack based on the first type.

In other features, a power tool that is adapted to be powered by one of a plurality of battery packs of different types includes a plurality of terminals. The power tool electrically communicates with one of the battery packs through the plurality of terminals. A remote communication device of the power tool generates signals in response to remote detection of the battery pack. A control module of the power tool includes a remote sensing module that receives signals from the remote communication device. The control module further includes a battery pack connection module that determines that the battery pack is in electrical communication with the power tool based on communications with the battery pack through the plurality of terminals. The control module further includes a battery pack identification (ID) module that determines a first type of the battery pack based on remote sensing module signals. The control module further includes a charge control module that determines a discharge setting for the battery pack based on the first type.

In other features, the remote communication device includes at least one of a magnet sensing device, a radio frequency (RF) receiver, an RF transceiver, an optical device, such as a light emitting device or light emitting diode, a photosensor or other optical means/sensing means, an infrared transmitter/receiver, and a proximity switch. The magnet sensing device includes a Hall effect sensor. The first type includes Lithium-ion (Li-ion) battery cells. The remote sensing module only communicates remotely with battery packs of the first type. A fault warning module determines that there is a fault in at least one of the battery charger, the power tool, and one of the battery packs. The fault determination is based on battery pack connection module signals indicating electrical communication and battery pack ID module signals indicating the battery pack is of the first type. The fault warning module determines that one of the plurality of terminals is at least one of inoperable and not present.

In other features, a housing includes a first side and a second side. The one of the battery packs couples to the second end. The remote communication device is positioned within the housing an optimized distance from the second side for the remote detection. An arm is coupled to the first side within the housing and extends toward the second side. A platform is mounted on the arm, and the remote communication device is mounted on the platform.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
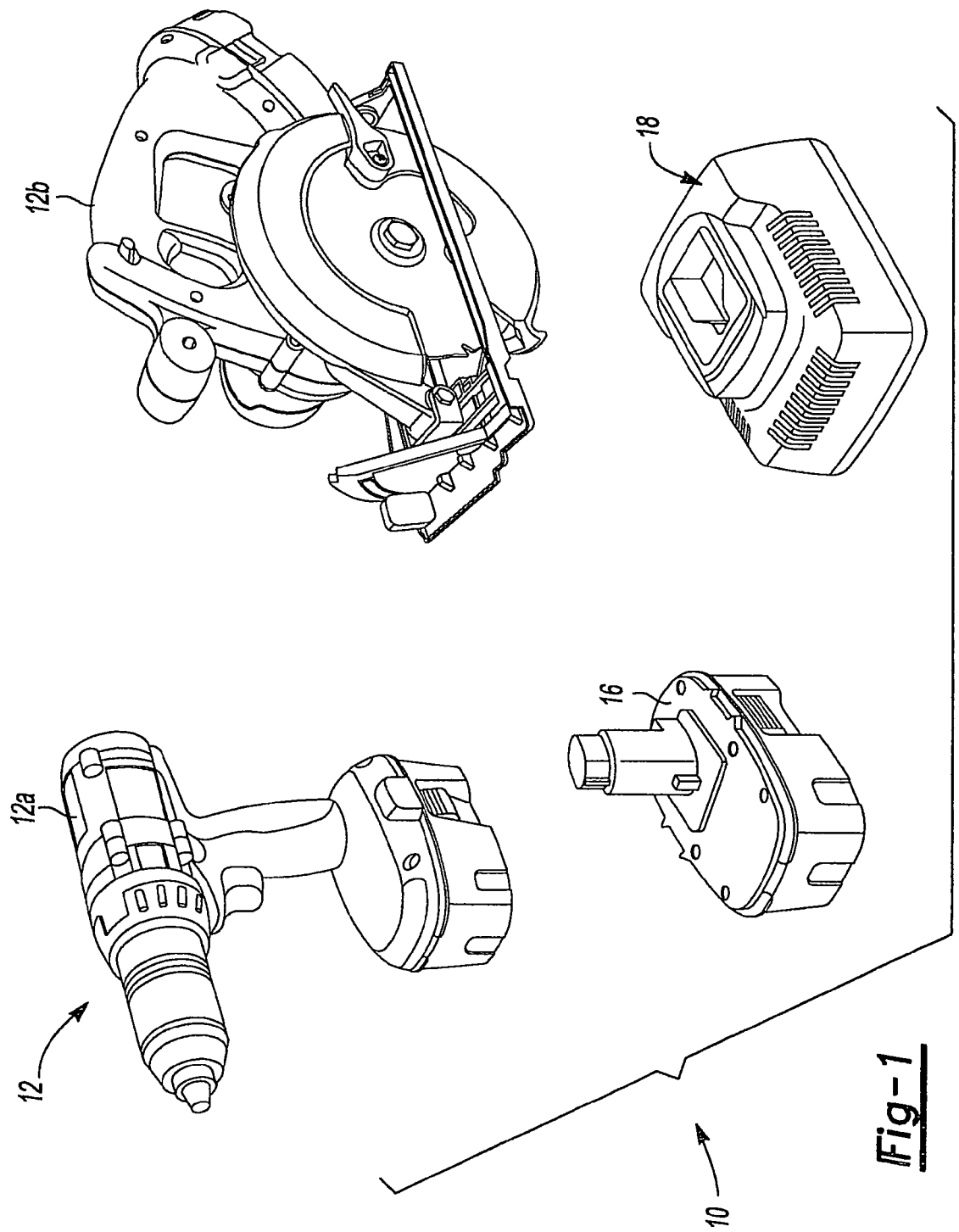
FIG. 1 is a system of power tools according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, the present disclosure can relate to a system of power tools of the type that is generally indicated by reference numeral 10. The system of power tools 10 can include, for example, one or more power tools 12, a battery pack/system 16 and a battery pack charger 18. The battery pack 16 and the charger 18 may communicate both remotely and through terminals 19-1, 19-2, 19-3. Each of the power tools 12 can be any type of power tool, including without limitation drills, drill/drivers, hammer drill/drivers, rotary hammers, screwdrivers, impact drivers, circular saws, jig saws, reciprocating saws, band saws, cutoff tools, cut-out tools, shears, sanders, vacuums, lights, routers, radios, adhesive dispensers, concrete vibrators, lasers, staplers, nailers, worklights, generators and compressors.

In the particular example provided, the system of power tools 10 includes a first power tool 12a and a second power tool 12b. For example, the first power tool 12a can be a drill/driver similar to that which is described in U.S. Pat. No. 6,431,289, while the second power tool 12b can be a circular saw similar to that which is described in U.S. Pat. No. 6,996,909. The battery pack 16 can be selectively removably coupled to the first and second power tools 12a and 12b to provide electrical power thereto. Except as otherwise described herein, the battery pack 16 can be configured in a manner that is similar to that which is described in U.S. Patent Application Publication No. 2006/0096771. The battery pack 16 can also be selectively electrically coupled to the battery pack charger 18 to charge the battery pack 16.

Figure 2:
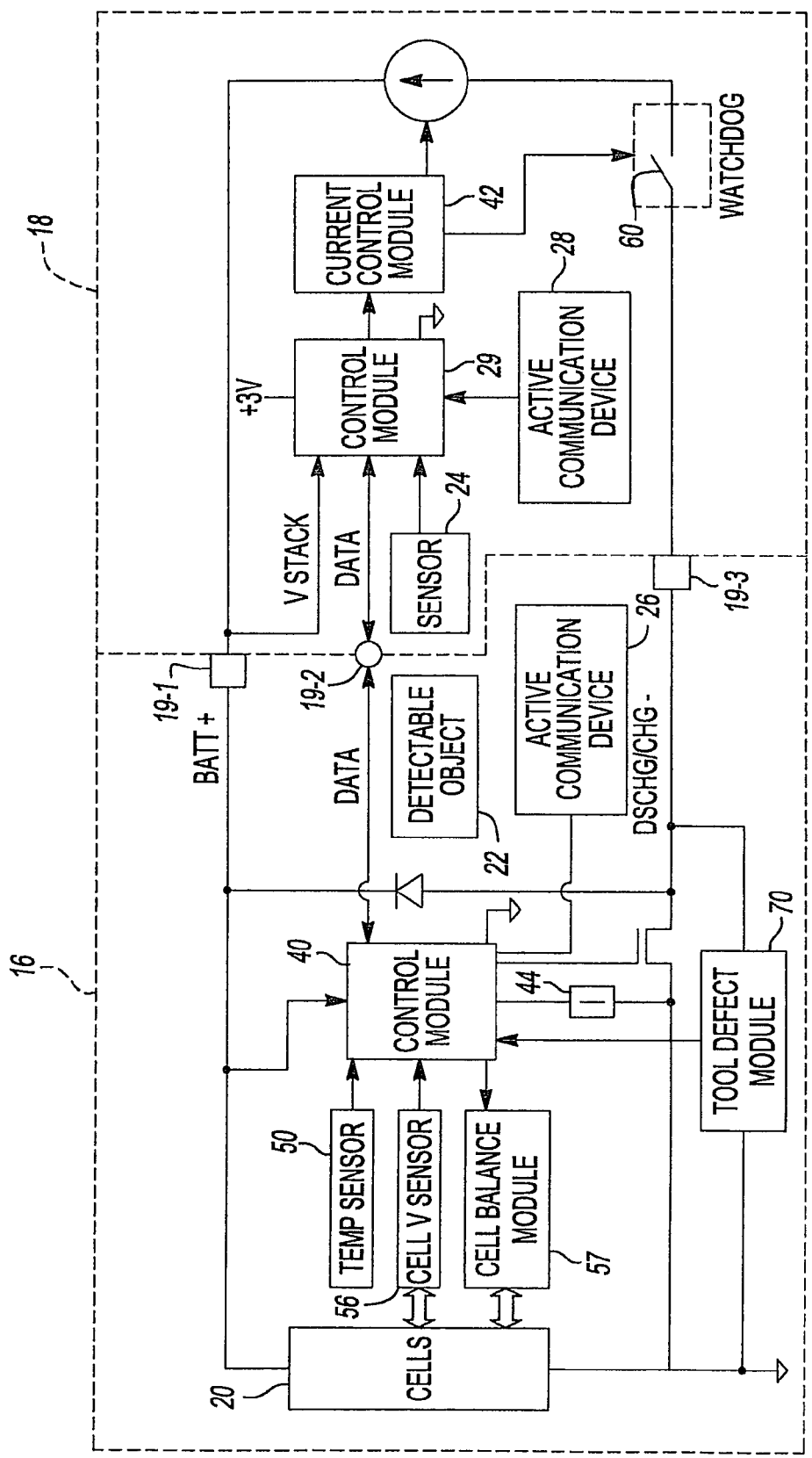
FIGS. 2-3 are schematic diagrams of a battery pack communicating with a charger according to the present disclosure.
Figure 3:
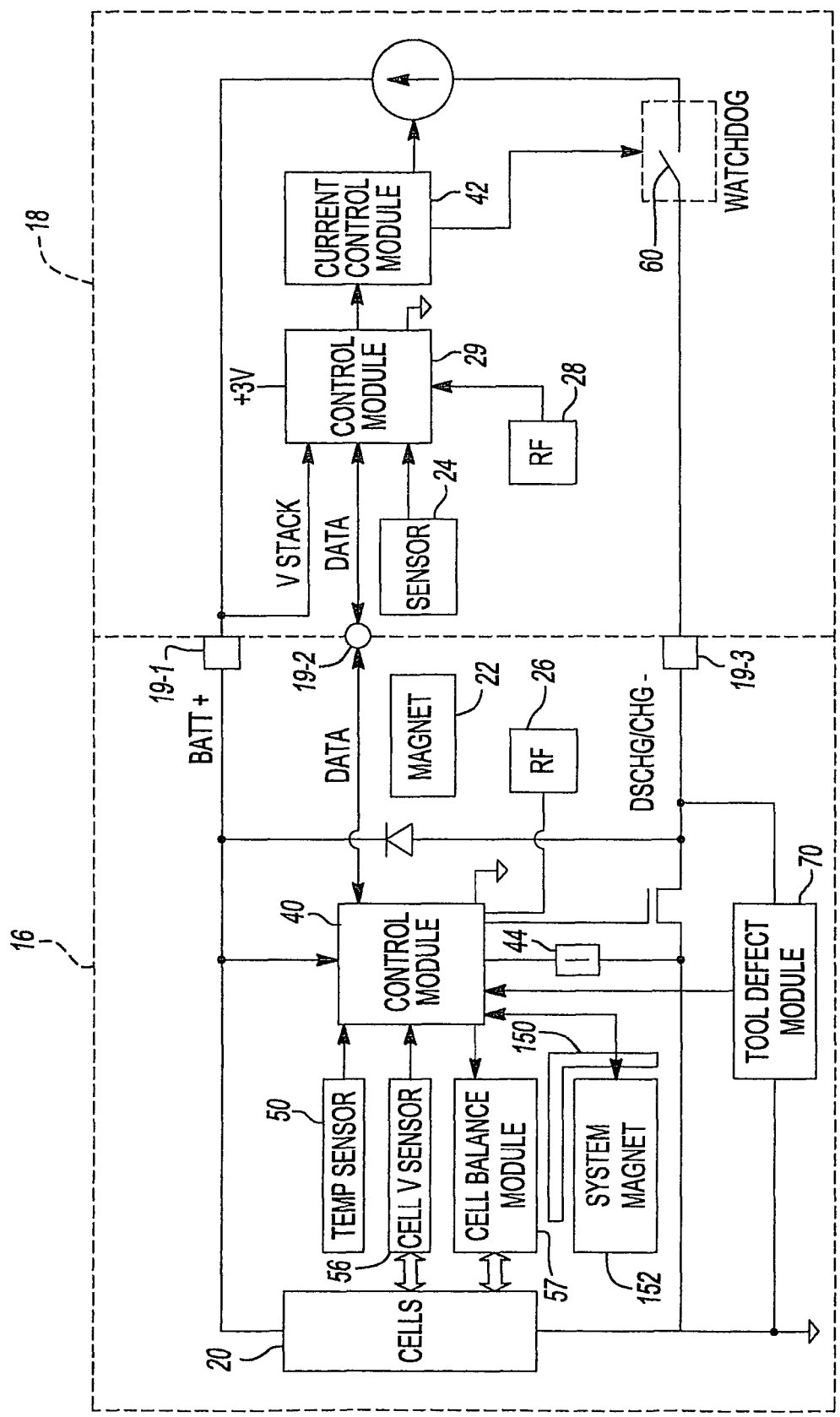

Referring now to FIGS. 2-3, a battery pack 16 may include a plurality of battery cells 20 connected in series. As the exemplary embodiments are directed to the cordless power tool environment, the nominal voltage rating of the battery pack 16 may range from 3.6v to 36v. The pack 16 may be understood as a removable power source for high-power power tool operations.

The battery pack 16 may include lithium-ion (Li-ion) cells or cells of another lithium-based chemistry, such as lithium metal or lithium polymer, or other chemistry such as nickel cadmium (NiCd), nickel metal hydride (NiMH) and lead-acid. The battery pack 16 communicates with the tool 12 and or charger 18 through various terminals. Exemplary embodiments should not be limited to the illustrated terminal configuration, as more or less terminals could be included depending on the desired information passed between, or parameters monitored by the pack 16, charger 18, or tool 12.

The battery pack 16 may also communicate in a remote manner passively and/or actively with the charger 18 and/or power tool 12. Passive communication may include detection of an object associated with the battery pack 16, such as a magnet 22. Important to note is that the magnet 22 may alternatively be representative of any other detectable object and need not be limited to magnets and is therefore generically referred to as a detectable object in FIG. 2.

The charger 18 (or power tool 12) may include a Hall effect sensor 24 that detects the magnet 22. The Hall effect sensor 24 may be a transducer that varies output voltage in response to changes in magnetic field density. In its simplest form, the Hall effect sensor 24 operates as an analogue transducer, directly returning a voltage. The Hall effect sensor 24 may include groups of sensors to provide information such that the relative position of the magnet 22 can be deduced. Important to note is that the Hell effect sensor 24 may alternatively be any sensing device that detects any property/characteristic of a magnet. Also important to note is that the sensor 24 may alternatively be representative of any other detection device used for passive or active detection, as seen in FIG. 2. Detection devices include proximity switches that may detect sonar, photoelectric/photovoltaic, inductive and capacitive characteristics of devices or objects within the battery pack 16.

Active communication may also include radio frequency (RF) communication devices 26, 28 (for example transceivers) in each of the battery pack 16 and charger 18 and/or power tool 12 that communicate, for example, using any one of IEEE standards 802.11, 802.11a, 802.11b, 802.11g, 802.11h, 802.11n, 802.16, 802.20 and/or Bluetooth, which are incorporated by reference herein in their entirety. Important to note is that the RF devices 26, 28 may merely be representative of active communication devices, and are referred to broadly as such in FIG. 2, and need not be limited to RF devices. Active communication devices may also include optical communication devices, such as light emitting/receiving devices, which may be light emitting diodes (LEDs) and photosensors or other optical means/optical sensing means. Active communication may also include communication between infrared transmitter and receiver devices.

Figure 4:
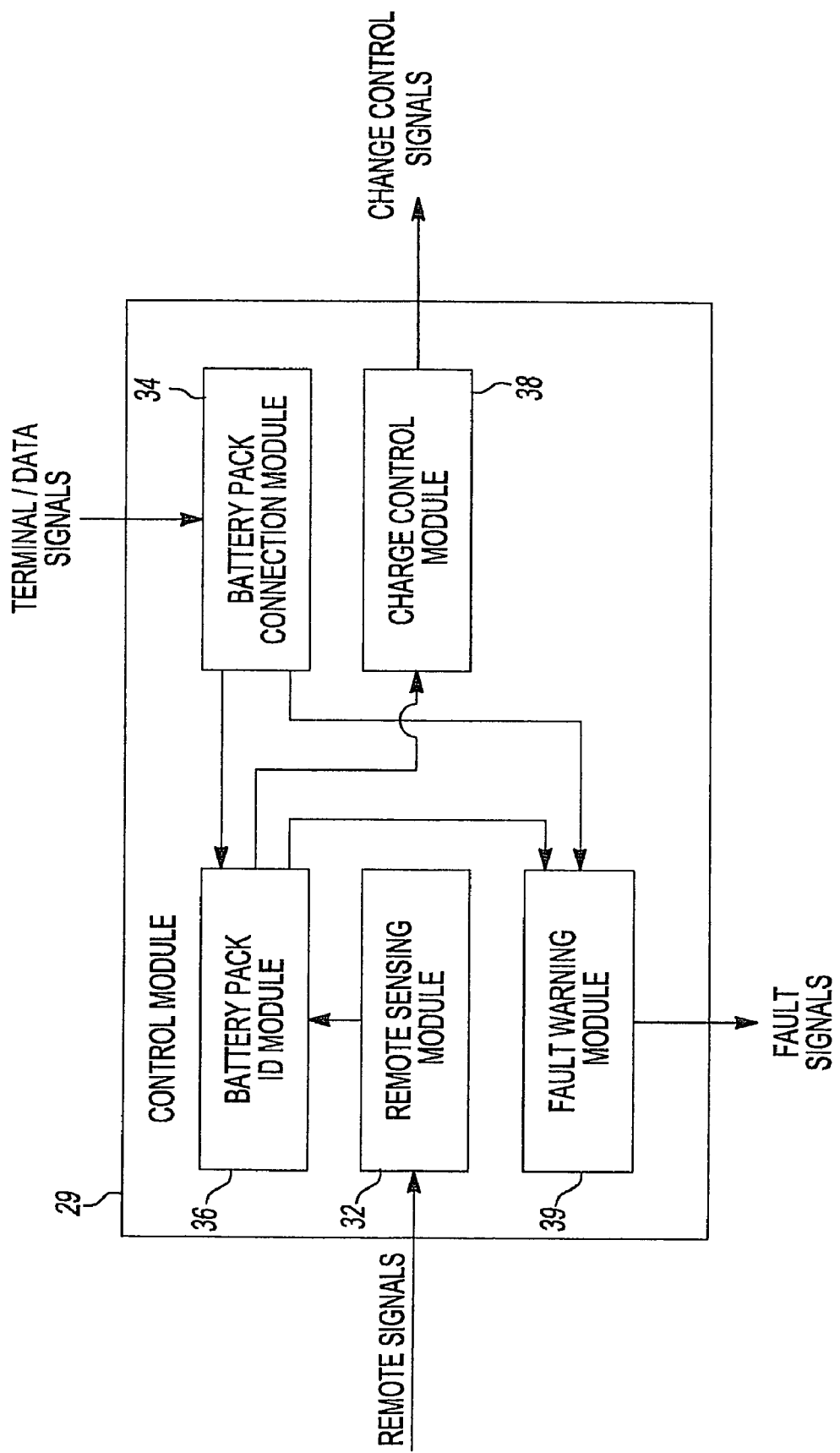
FIG. 4 is a schematic diagram of a charger control module according to the present disclosure.

Referring now to FIG. 4, the charger 18 may include a control module 29 that receives signals from the Hall effect sensor 24 and/or the RF device 28. The control module 29 may include a remote sensing module 32 that determines that the battery pack 16 is in electrical communication with the charger 18 or at least in a close proximity to the charger 18 based on the signals. The control module 29 may also include a battery pack connection module 34 that determines that a battery pack is connected. Important to note is that the aforementioned control module 29 and associated devices may alternatively be included in a power tool 12 for detection and identification of the battery pack 16.

The control module 29 may also include a battery pack identification (ID) module 36 that determines a type of battery pack that is connected based on remote sensing module 32 signals. For example, a battery pack having Li-ion cells may include the magnet 22 or other remote device/object, whereas other types of battery packs may not have such a magnet. In other words, the control module 29 may determine that the battery pack 16 is a Li-ion battery pack because a magnet is present in the battery pack 16. Alternatively, some types or all types of battery packs may include RF devices, and the battery pack ID module 36 may determine what type of battery pack is attached based on RF communications that include remote transfer of ID data.

The control module 29 may also include a charge control module 38 (which may represent a discharge control module for a power tool 12) that determines a proper charge (or discharge) setting for the battery pack 16 based on battery pack ID module signals. For example, Li-ion cells may require different charge parameters than NiCd cells because Li-ion cells may overheat if charged and/or discharged improperly.

The control module 29 may also include a fault warning module 39 that determines that there is a fault in any of the charger 18, the battery pack 16, and the power tool 12. For example, the fault warning module 39 may receive battery pack ID module signals that indicate a Li-ion battery pack is connected without receiving confirmation data through the data terminal 19-2 from a control module 40 of the battery pack 16. The fault warning module 39 may then determine that the data terminal 19-2 is faulty or not present and shut down charging and/or discharging operations.

An exemplary algorithm for fault warning includes checking the terminals and/or receiving data through the terminals; detecting a magnet in the battery pack; determining that at least one of the terminals is not contacting properly; generating an error/warning signal; and shutting down charging operations.

The charger 18 and/or power tool 12 may also include a current control module 42 that controls charging and/or discharging of current based on control module signals. The current control module 42 may control a watchdog switch 60 that may be switched open to prevent charging/discharging operations for example when a terminal is faulty. In other words, the switch 60 may clamp or discontinue charge/discharge current.

Referring again to FIGS. 2-3, the control module 40 of the battery pack 16 may receive signals from a current sensor 44, a temperature sensor 50, a voltage sensor 56, and a cell balancing module 57. The temperature sensor 50 measures temperature of the cells. The temperature sensor 50 may be embodied as negative temperature coefficient (NTC) or positive temperature coefficient (PTC) thermistors, temperature sensing integrated circuits, or thermocouples. The control module 40 and/or intelligence in a connected charger 18 and/or power tool 12 may receive temperature sensor 50 signals.

The current sensor 44 may be embodied as known components for current sensors, such as a shunt resistor, current transformer, etc., which may provide a signal representing sensed current in pack 16. The voltage sensor 56 may be configured to sense individual cell voltage and/or sense total pack voltage of the cells 20 and may provide a signal representing the individual cell or stack voltage.

The battery pack 16 may also include a tool detect module 70 that determines that the tool 12 is in communication with the battery pack 16. The control module 40 may communicate tool detect module signals to the control module 29 of the charger 18.

Figure 5:
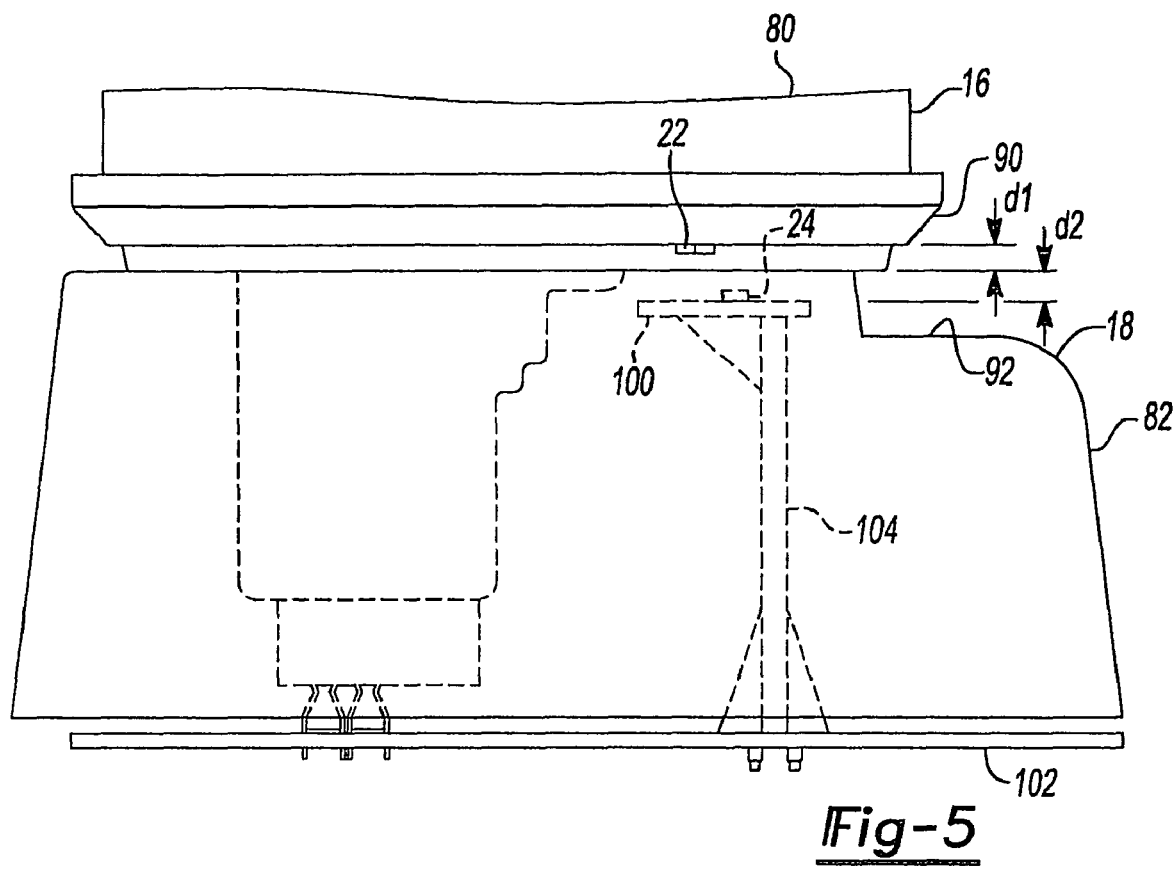
FIG. 5 illustrates a battery pack communicating with a charger according to the present disclosure.
Figure 6:
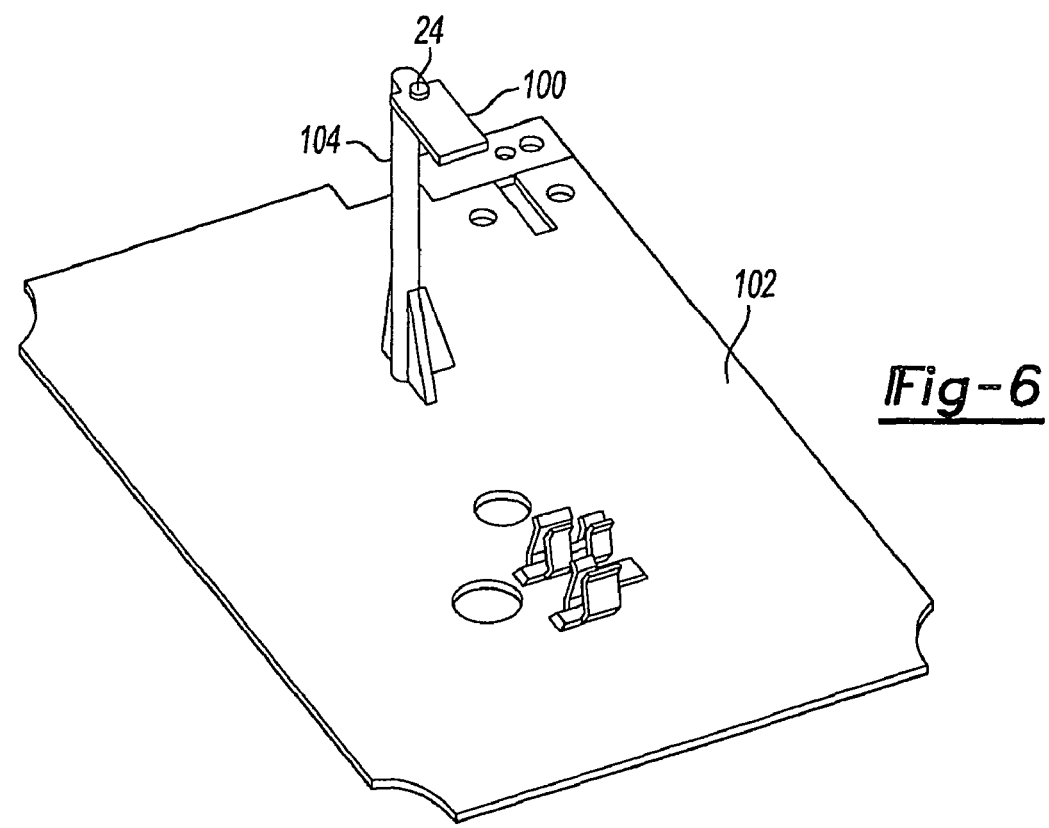
FIG. 6 is a perspective view of a platform for a Hall effect sensor according to the present disclosure.

Referring now to FIGS. 5-6 an exemplary battery pack 16 is illustrated in communication with an exemplary charger 18. Both the battery pack 16 and charger 18 may include exemplary housings 80, 82 that house respective electrical and mechanical portions thereof. The magnet 22 may be positioned in the battery pack 16 in close proximity (d1) to a side 90 of the battery pack housing 80 that is closest to the charger 18 during charging. The Hall effect sensor 24 may be positioned in the charger 18 in close proximity (d2) to a side 92 of the charger housing 82 that is closest to the battery pack 16 during charging. d1 and d2 may be optimized and/or predetermined based on magnetic field density such that a particular magnetic field density causes the control module 29 to recognize the presence of the magnet 22.

The Hall effect sensor 24 may be positioned on a platform 100 that is distanced from a base 102 of the charger 18 by an arm 104. The arm 104 extends from the base 102 to the side 92 of the charger 18 that is closest to the battery pack 16 during charging.

The charger 18 may charge the battery pack 16 while the battery pack 16 is attached to a tool 12. The tool 12 may also include one or more magnets. For example, a radio that uses the battery pack 16 may include speaker magnets. The control module 29 may be able to distinguish Hall effect sensor signals based on the magnet 22 as opposed to signals based on other magnets in devices in close proximity to the Hall effect sensor 24. Further, barrier materials 150 may be used in the charger 18, the battery pack 16, and/or the tool 12 to shield the magnet 22 and/or the Hall effect sensor 24 from other magnets 152 in the system 10.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A power tool system, comprising:

first battery means for holding battery cells of a first type comprising at least one of a magnet, radio frequency (RF) means for transmitting, and optical means for transmitting comprising first terminal means for communicating; and battery charger means for charging comprising second terminal means for communicating with said first terminal means and further comprising remote communication means for generating signals in response to remote detection of said at least one of said magnet, said RF means, and said optical means, said battery charger means further comprising control means for receiving signals from said remote communication device, for determining that said first battery means is in electrical communication with said battery charger means based on communications with said first battery means through said second terminal means, for determining battery means identification by determining whether said first battery means is of said first type based on the signals from said remote detection, and for determining a charge setting for said first battery means based on said battery means identification and;

second battery means of a second type that communicates with said battery charger means and that does not include remote communication means.

2. The power tool system of claim 1 wherein said first battery means comprises a housing that comprises a first side and a second side, wherein said at least one of said magnet, said RF means, and said optical means is positioned a first predetermined distance from said first side.

3. The power tool system of claim 2 wherein said remote communication means comprises at least one of magnet sensing means for sensing said magnet, RF receiver means for receiving an RF signal, RF transceiver means for communicating, and optical means for communicating.

4. The power tool system of claim 3 wherein said magnet sensing means comprises a Hall effect sensor.

5. The power tool system of claim 3 wherein said first type includes lithium based battery cells.

6. The power tool system of claim 1 wherein said control means further determines that there is a fault in at least one of said battery charger means and said first battery means based on signals indicating electrical communication and signals indicating said first battery means is of said first type.

7. The power tool system of claim 6 wherein said control means determines that one of said second terminal means is at least one of inoperable and not present.

8. The power tool system of claim 1 wherein said second type comprises at least one of nickel cadmium (NiCd), nickel metal hydride (NiMH), and lead-acid.

9. A power tool system, comprising:
a battery pack of a first type having a magnet embedded in the battery pack;
a battery pack of a second type without a magnet embedded in the battery pack; and
a battery charger that operably couples to the first type of battery pack and to the second type of battery pack and configured with a magnetic sensor that is operable to detect presence of the magnet when operably coupled to the first type of battery pack and operable;
the battery charger having a charge control module that implements different charging procedures based on the type of battery pack coupled thereto.

10. The power tool system of claim 9 wherein the first type of battery pack having a different battery cell chemistry than the second type of battery pack.

11. The power tool system of claim 9 wherein the magnetic sensor is further defined as a Hall effect sensor.

12. The power tool system of claim 9 wherein the charge control module implements a first type of charging procedure upon detecting the first type of battery pack and implements a second type of charging procedure that is different from the first type of charging procedure when the first type of battery pack is not detected by the charge control module.

* * * * *